April 1, 1947.  R. W. STARR  2,418,240
FULL AUTOMATIC LANDING LEGS FOR SEMI-TRAILERS
Filed May 8, 1945  5 Sheets-Sheet 1
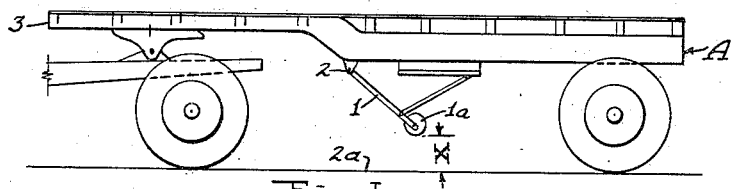
Fig-1-
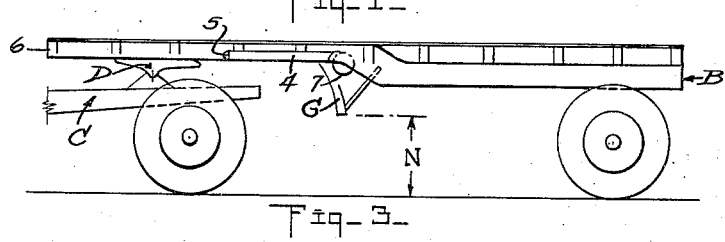
Fig-3-
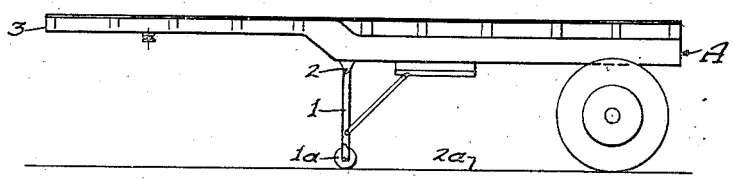
Fig-2-
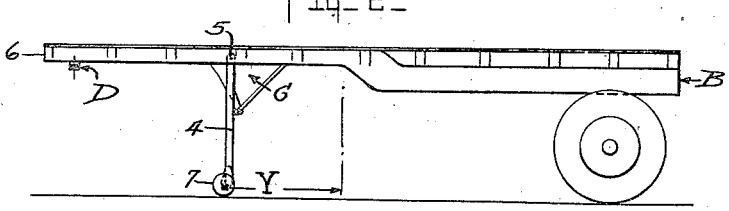
Fig-4-
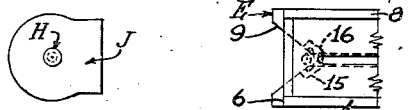
Fig-23-
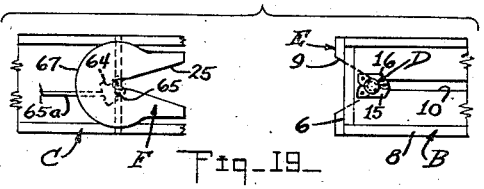
Fig-19-
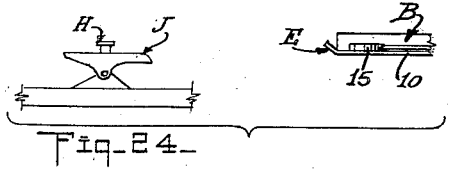
Fig-24-    Fig-20-
Fig-22-
INVENTOR.
RALPH W. STARR
BY Munn, Liddy & Glaccum
ATTORNEYS April 1, 1947.  R. W. STARR  2,418,240
FULL AUTOMATIC LANDING LEGS FOR SEMI-TRAILERS
Filed May 8, 1945  5 Sheets-Sheet 2

INVENTOR.
RALPH W. STARR
BY
Murray, Liddy & Glaccum
ATTORNEYS

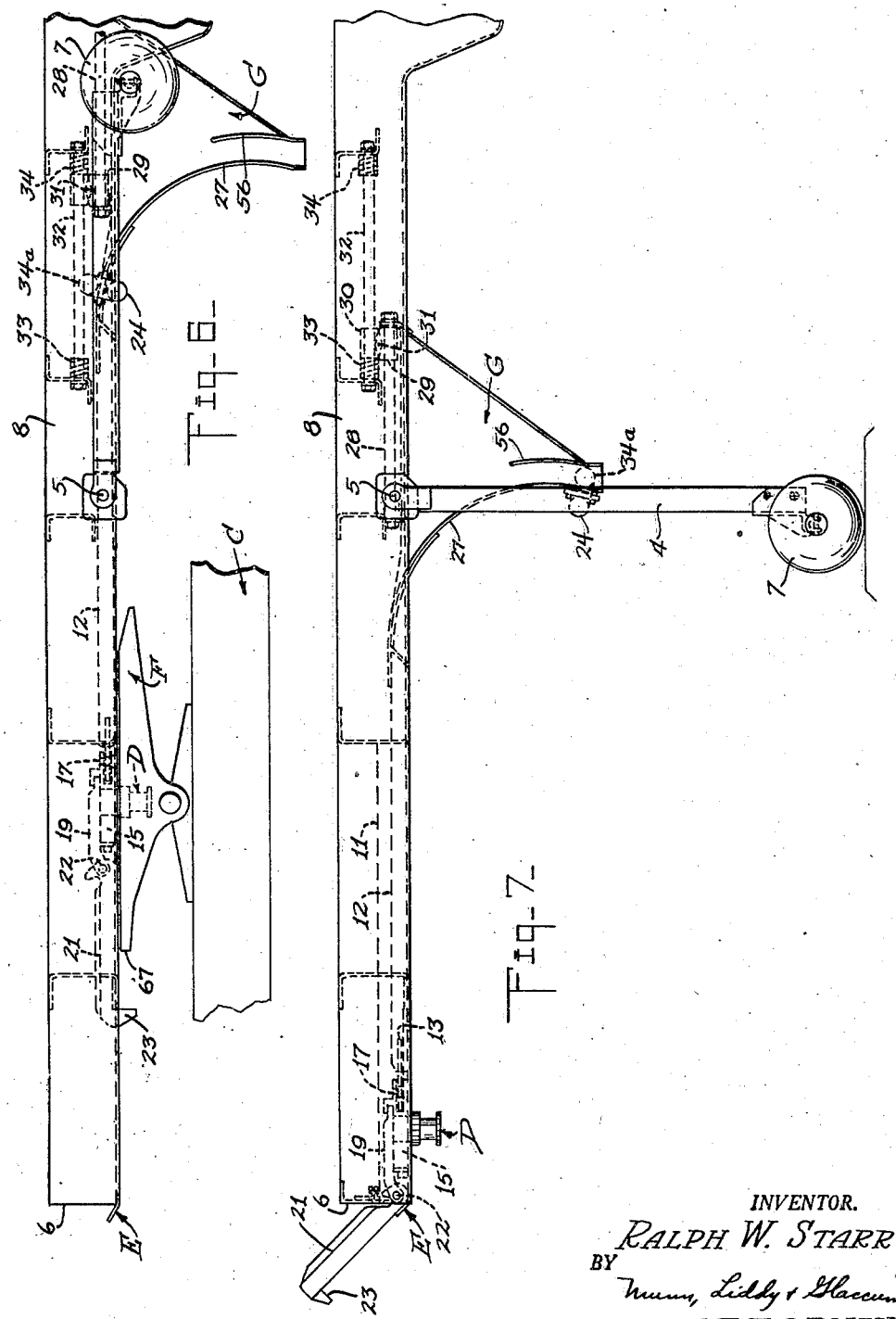

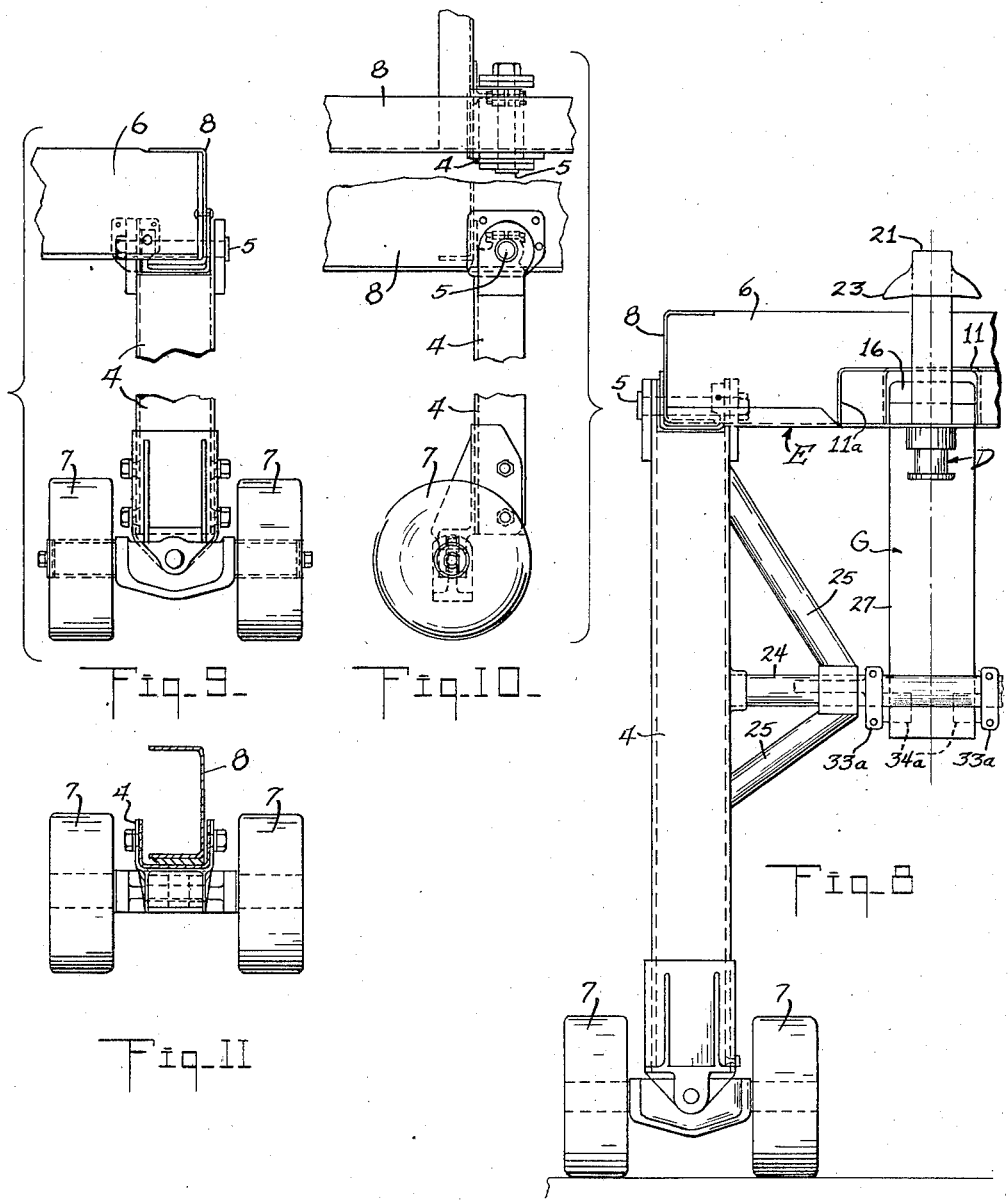

April 1, 1947.    R. W. STARR    2,418,240
FULL AUTOMATIC LANDING LEGS FOR SEMI-TRAILERS
Filed May 8, 1945    5 Sheets-Sheet 5

INVENTOR.
RALPH W. STARR
BY Munn, Liddy & Glaccum
ATTORNEYS

Patented Apr. 1, 1947

2,418,240

UNITED STATES PATENT OFFICE 2,418,240

FULL AUTOMATIC LANDING LEGS FOR SEMITRAILERS

Ralph W. Starr, Napa, Calif.

Application May 8, 1945, Serial No. 592,551

10 Claims. (Cl. 280—33.1)

An object of my invention is to provide full automatic landing legs for semi-trailers, which is an improvement over the form of my invention shown in my co-pending application, Serial No. 545,326, filed July 17, 1944. In the co-pending case I show locking jaws for engaging with a king pin of a truck or other power vehicle and these jaws are held in operative relation with the king pin when the trailer is connected to the pulling vehicle.

In the present invention, the design has been to meet the demand of the trucking industry for better, more interchangeable, safer and easier to operate equipment. The location of the landing legs and wheels on my present trailer when in their lowered position are a substantial distance forward of the conventional type landing legs. This new location of the landing wheels helps prevent the tipping over forward of the semi-trailer when the front part of the semi-trailer body is being loaded while the tractor is detached. The landing legs are of a new type so that when they are swung into inoperative position they will parallel the trailer chassis. This permits the tractor truck to pivot in relation to the semi-trailer.

A further object of my invention is to provide an improved locking mechanism between the semi-trailer and tractor truck that is adapted to function with either a male fifth wheel or a female fifth wheel. The locking mechanism is such that it will hold the legs in inoperative position and against accidental displacement when the trailer is connected to the tractor truck. Also the locking mechanism will hold the legs in operative position and against accidental displacement when the trailer is disconnected from the powered vehicle.

Where the king pin is permanently secured to the jaws, a safety dog is used in connection therewith for temporarily securing the trailer to the female fifth wheel of the truck should the king pin become disconnected from the jaws for any reason.

Other objects and advantages will appear in the following specification, and the novel features of the device will be particularly pointed out in the appended claims.

My invention is illustrated in the accompanying drawing forming a part of this application, in which:

Figure 1 is a schematic showing of a conventional trailer connected to a powered vehicle and illustrates the height the landing legs are spaced above the road-bed when the legs are held in inoperative position;

Figure 2 shows the legs of the same trailer in operative position;

Figure 3 is a schematic view of my improved semi-trailer showing how the legs are received up under the trailer frame when held in inoperative position;

Figure 4 shows the landing legs of the trailer in Figure 3 swung into operative position;

Figure 6 is an enlarged side elevation of Figure 5 showing the landing wheels in raised position;

Figure 7 is similar to Figure 6 and shows the legs in operative position;

Figure 8 is a front elevation on a larger scale of one of the landing legs shown in operative position;

Figure 9 is a view similar to Figure 8 but shows the opposite landing leg.

Figure 10 is a side and top view of Figure 9;

Figure 11 shows the leg in raised or inoperative position;

Figure 19 is a diagrammatic showing of the semi-trailer and truck where the truck has a female fifth wheel;

Figure 20 is a side view of the trailer and truck portions shown in Figure 19;

Figure 22 is a plan view of the locking dog used for the king pin shown in Figures 19 and 20;

Figure 23 is a schematic plan view of the semi-trailer and truck portions showing the truck as having a male fifth wheel;

Figure 24 is a side elevation of the trailer and truck portions shown in Figure 23.

Figure 5:
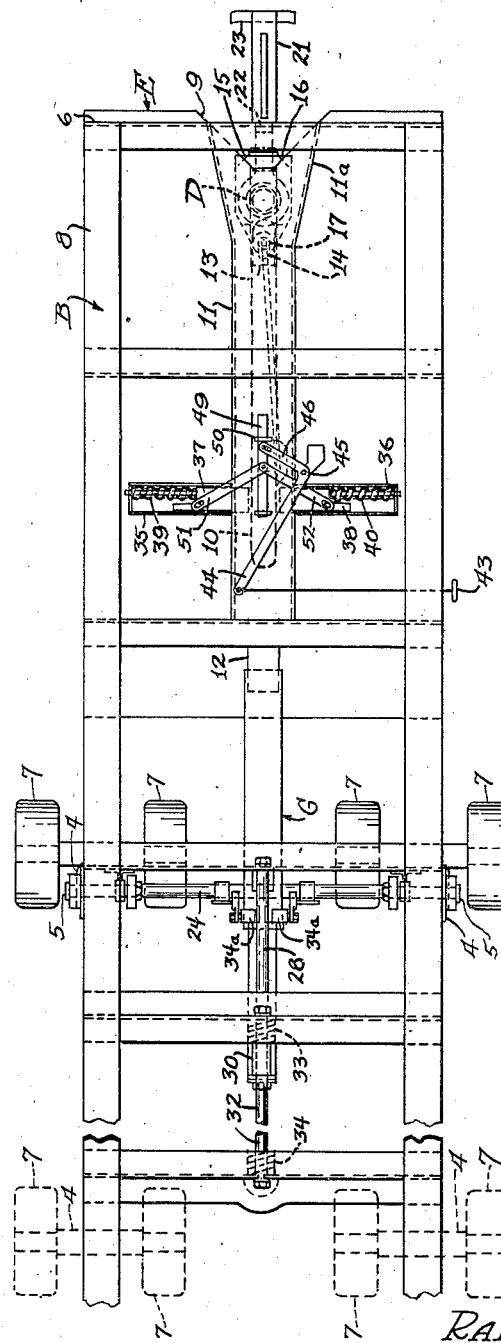
Figure 5 is a top plan view of my trailer.

While I have shown only the preferred forms of my invention, it should be understood that various changes or modifications may be made within the scope of the appended claims without departing from the spirit and scope of the invention.

In carrying out my invention I show in Figures 1 and 2 a conventional trailer indicated generally at A. This trailer has landing legs 1 pivoted to the trailer at 2 and it will be noted that the pivot points for the legs are disposed a considerable distance in back of the front 3 of the trailer. It will further be noted that when the legs 1 are in inoperative position, see Figure 1, the wheels 1a carried by the legs, will be disposed only a slight distance above the road bed 2a as indicated by the letter X in Figure 1.

In Figures 3 and 4 I show a schematic view of my semi-trailer indicated generally at B. This trailer has landing legs 4 that are pivoted at 5 to the trailer at a point much nearer to the front 6 of the trailer than that shown in Figures 1 and 2 for a standard trailer. When the trailer is connected to a truck C, the king pin indicated at D in Figure 3 will be disposed near the pivot point 5 for the legs 4. When therefore, the legs are extended for supporting the front of the trailer when the truck is disconnected therefrom, the pivot 5 will be so close to the position where the trailer was formerly supported by the truck that the front end of the trailer can be loaded without any tendency for the trailer to tip over forwardly. The legs 4 are three feet nine inches nearer the front 6 when the legs are in operative position, than are the legs 1 when they are in operative position and this distance is indicated by Y in Figure 4.

It will further be seen from Figure 3 that when the landing legs 4 are in inoperative position they will swing the wheels 7, carried by the legs into an out-of-the-way position and here the wheels will be disposed at a much higher level than shown for the wheels in the conventional trailer, as shown in Figure 1. The clearance space Z shown in Figure 3 is much greater than the clearance space X shown in Figure 1.

Figure 21:
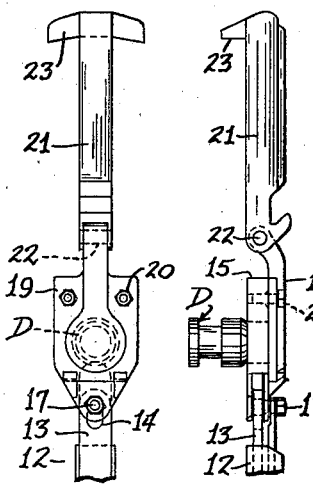
Figure 21 is a plan and side view of the king pin permanently secured to closed jaws and shows the safety dog in relation to the jaws.
Figure 18:
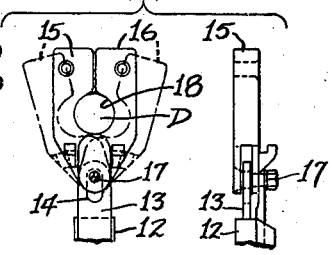
Figure 18 is a plan and side view of the king pin receiving jaws when used in connection with a male fifth wheel.

In Figure 5 I show a plan view of the trailer B. The trailer has the usual channel iron frame, indicated generally at 8. The upper fifth wheel E is a plate underlying the frame and it has a V-shaped notch or recess 9 therein and a centrally disposed king pin receiving slot 10, the slot extending from the recess 9 rearwardly for a considerable distance. A guide channel 11 overlies the slot and has a flared front 11a that extends to the front end of the trailer. A channel bar 12 travels in the guide 11 and is spaced from the walls thereof, see Figure 13. The front end of the channel bar 12 carries a tongue 13 that is slotted at 14. A pair of king pin receiving jaws 15 and 16 are pivoted to each other at 17 and have recesses 18 for receiving the king pin D, see Figure 21. In my preferred form of the invention, the jaws 16 are permanently secured together and to the king pin D. The jaws are connected to a plate 19 by cap screws 20 or other suitable fastening means.

The plate 19 extends in front of the jaws and pivotally carries a safety dog 21 at 22. The safety dog 21 has a jaw 23 at its front end, the function of which will be described hereinafter. Since the king pin D forms a permanent part of the jaws 15 and 16, the jaws and the king pin will move as a unit.

I will first describe how the rearward movement of the channel bar 12 caused by the rearward movement of the king pin D and the jaws will swing the legs 4 into inoperative position and then I will set forth the novel mechanism for securing the legs both in inoperative position and in operative position.

The channel bar 12 may be in practice a pair of elongated members connected to the tongue 13 at their forward ends and to a leg-lifting track G at their rear ends. Figure 7 shows the legs in operative position and the king pin D is shown disposed near the front of the trailer frame 8 and the safety dog 21 in raised position. Figure 19 shows the truck C with a female lower fifth wheel F provided with a recess 25 for receiving the king pin D of the trailer B. As the lower fifth wheel F of the truck C, see Figure 20, moves under the semi-trailer B, the upper fifth wheel E on the trailer frame will ride up onto the lower fifth wheel F and the king pin D will be received in the V-shaped recess 25. As the truck C moves rearwardly with respect to the trailer B, the king pin D will be moved from its forward position in Figure 7, into its rear position, shown in Figure 6. The initial movement of the king pin will carry the pivot bolt 17 of the jaws rearwardly in the slot 14 for a purpose hereinafter described and further rearward movement will cause the jaws and bolt 17 to move the channel bar along the guide 10.

Figure 14:
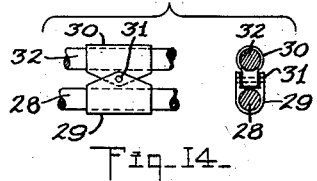
Figure 14 is a side elevation and transverse section of the shafts and sleeves for supporting the leg-lifting track.
Figure 16:
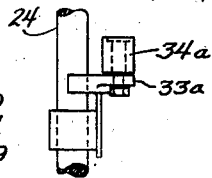

The bar 12 is connected at its inner end to a landing leg lifting track G. Rearward movement of the bar 12 will cause it to move the lifting track G, and the track has an arcuate cam 27 of the shape shown in Figures 6 and 7. The track G has a supporting shaft 28 at its top and a sleeve 29 slides along the shaft, see Figure 7, and is pivotally connected to a second sleeve 30 at 31. Figure 14 shows the two sleeves 29 and 30 and the pivot point 31 forming a slide link for supporting the track G. The upper sleeve 30 slides on a stationary shaft that is carried by the trailer frame. Figure 7 shows the shaft 32 provided with coiled springs 33 and 34 at each end thereof to act as bumpers.

The initial movement of the track G rearwardly will cause the sleeve 29 to traverse the length of the shaft 28 whereupon further rearward movement of the track will cause the sleeve 30 to traverse the length of the shaft 32. The combined movements of the two sleeves on the two shafts is sufficient for the track G to move from the position shown in Figure 7 into the position shown in Figure 6 and to raise the legs 4 and wheels 7 from operative to inoperative position.

The landing legs are pivoted to the frame at 5 and they are interconnected by a cross bar 24 which is reinforced by struts 25, see Figure 8. The bar 24 has arms 33a which carry rollers 34a that ride on the cam 27. It will be seen that as the track G is moved rearwardly from the position shown in Figure 7 into that shown in Figure 6, the rollers 34a will be raised by the arcuate cam 27 and will swing the legs 4 upwardly about the pivots 5. During this movement the sleeve 29 will slide on the shaft 28 and the sleeve 30 will slide on the shaft 32.

The legs 4 are channel-shaped as shown in Figure 11, and the channel of each leg is adapted to receive the channel of the frame chassis 8 when the leg is swung into its raised position about the pivot 5. This will cause the wheels 7 carried by each leg to straddle the channel forming the side of the chassis. Figure 6 shows how the wheels are moved into an out-of-the-way position when the legs are retracted.

Figure 25:
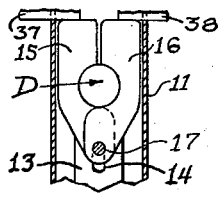
Figure 25 is a horizontal section showing the king pin receiving jaws in retracted position.
Figure 17:
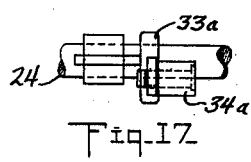
Figures 15, 16 and 17 are a side, plan and front elevation respectively of the leg swinging rollers.
Figure 15:
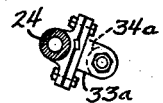
Figure 12:
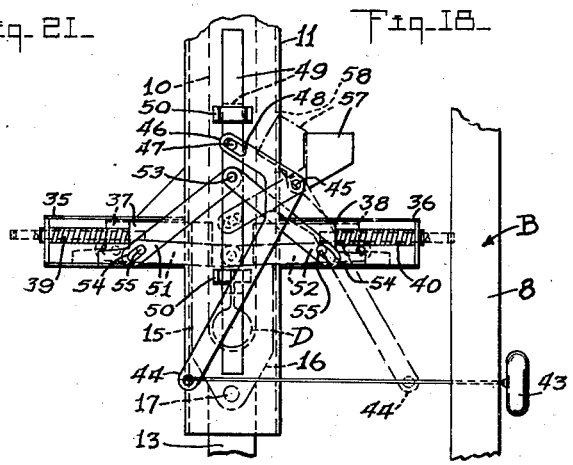
Figure 12 is a plan view of the locking mechanism.

I will now describe the mechanism for holding the legs in retracted position so that they cannot drop accidentally while the semi-trailer is connected to the truck. In Figure 12 I show two laterally extending guides 35 and 36 which slidably carry locking dogs 37 and 38. Coil springs 39 and 40 urge the dogs inwardly, the inner ends of the dogs passing through openings 41 and 42, see Figure 13. provided in the sides of the guide channel 11. When the dogs 37 and 38 are in their innermost positions they will contact with the front ends of the jaws 15 and 16. when the legs are in raised position, see Figure 25, and will prevent any accidental forward movement of the jaws with respect to the trailer frame. The jaws, in turn, will hold the legs 4 in raised position by means of the arcuate cam 27.

When it is desired to free the dogs so that the track G can be moved forwardly for lowering the legs into the position shown in Figure 7, a handle 43 is pulled, see Figure 12, and will swing a bell crank lever 44 about its pivot 45 from the full line position shown, into the dotted line position. The short arm 46 of the lever has a pin 47 receivable in a slot 48 and since the pin is carried by a bar 49, a swinging of the lever 44 will move the bar from its full line position to the dotted line position shown. The bar slides in guide brackets 50 that are mounted on top of the guide channel 11.

Links 51 and 52 are pivoted to the bar 49 at 53 and have slots 54 in their outer ends for receiving pins 55 that are carried by the dogs 37 and 38. When the lever 44 is swung into the broken line position, the movement is such that the bar 49 will swing the links 51 and 52 into a straight line or dead center position, as shown by the broken lines and this will move and hold the dogs 37 and 38 out of the guide channel 11 and free the jaws 15 and 16. The king pin D can now be moved forwardly and the jaws 15 and 16, the channel bar 12 and the track G will also move forwardly with the result that the legs 4 will be swung into a vertical position. As the legs near their vertical position, the rollers 34 will move in front of a short cam track 56, see Figure 7, and will force the legs into a position at right angles to the plane of the trailer frame.

It will be noted that the bell crank lever 44 has a detent 57 that is swung from the full line position into the broken line position shown in Figure 12, as the lever 44 is swung. The detent 57 swings into an opening 58 in the side of the guide channel 11 so as to lie in the path of the jaws 15 and 16. As the jaws move forwardly with the king pin upon being released by the dogs 37 and 38, they will strike the detent 57 and will move it out through the opening 58. This movement is sufficient to swing the lever 44 from its broken line position toward its full line position, the lever in turn moving the bar 49 and swinging the links 51 and 52 beyond dead center position. The springs 39 and 40 will now come into play and will again assume the position shown in Figure 13. The inward movement of the dogs will swing the links 51 and 52 and the bell crank lever 44 back into the full line position ready for the next operation.

Figure 13:
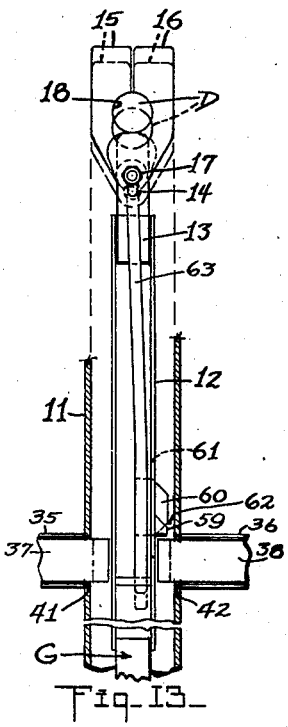
Figure 13 is a plan view of a portion of the leg releasing mechanism.

I provide novel means for securing the legs 4 in operative position so that they cannot be retracted accidentally before the semi-trailer is connected to the truck. In Figure 13, I show the channel 12 as having a tooth 59 in its side wall, the tooth extending outwardly as shown. The dog 38 lies in the path of the tooth and prevents the channel 12 and cam track G from moving rearwardly. Therefore the legs 4 cannot accidentally be swung into retracted position so long as the trailer remains disconnected from the truck.

A cam 60 slides in a slot 61 in the channel 12 and is provided with an inclined surface 62 that is adapted to retract the dog 38 when the cam 60 is moved toward the dog. The cam 60 slides under the tooth 59 and when the dog 38 is retracted, the track G and the channel 12 can be moved rearwardly. Figure 13 shows the initial movement of the jaws 15 and 16 rearwardly from the full to the broken line position and the jaws in making this movement will cause their bolt 17 to move a link 63 that is connected to the cam 60. It will be seen that the initial rearward movement of the jaws 15 and 16 will first free the dog 38 from the tooth 59 and then further movement of the jaws 15 and 16 rearwardly will cause them to move the tongue 13, the channel 12 and the cam track G for raising the legs 4. The bolt 17 slides in the slot 14 during the initial movement of the jaws.

From the foregoing description of the various parts of the device, the operation thereof may be readily understood.

I have already referred to the jaws 15 and 16 being permanently connected together and to a plate 19 when the king pin D is permanently secured to the jaws. Figure 22 shows a king pin jaw 64 having a pivot point at 65 and Figure 19 shows the jaw pivoted to the lower fifth wheel F. When the truck C is backed into connection with the semi-trailer B, the king pin D will be received in the recess 25 and when the king pin is at its innermost point in the recess, it will actuate the jaw 64 by striking the jaw portion 66. This will swing the jaw for securing the king pin to the truck in the usual manner.

When the king pin D is disconnected from the truck, the safety dog 21 will be held in a raised position, as shown in Figure 7. When the truck and trailer are connected, the safety dog 21 will be in a horizontal position as shown in Figure 6 and its jaw 23 will be placed so as to engage with the edge 67 of the lower fifth wheel, should the jaws 15 and 16 become accidentally disconnected from the king pin or should the jaw 64 of the lower fifth wheel F free the king pin. The jaw 23 acts as a safety precaution and will keep the truck and trailer temporarily connected until they can be brought to a stop. The jaw 64 is held against accidental swinging by a spring-pressed rod 65a (see Figure 19).

In Figures 23 and 24 I show the jaws 15 and 16 separable for engaging with a king pin H that is carried by a lower fifth wheel J. This form of the device is for a male fifth wheel and operates in much the same manner as the form shown in my co-pending application, Serial No. 545,326. Where the jaws 15 and 16 receive the king pin H the plate 19 and the safety dog 21 are dispensed with.

When using a female lower fifth wheel, as shown in Figures 19 and 20, and the operator wishes to connect the trailer to the truck he merely backs the truck towards the trailer and the king pin will be connected to the lower female fifth wheel. Then further rearward movement will first free the locking dog 38 from the tooth 59 in the manner previously described, and then the track G can be moved rearwardly for raising the wheels 7.

When the operator wishes to disconnect the trailer from the truck he pulls on the handle 43 for swinging the lever 44, shown in Figure 12, into the broken line position. This movement will separate the locking dogs 37 as previously described and 38 and remove them from a position in front of the jaws 15 and 16 (see Figure 25). The truck can now be moved away from the trailer and the king pin will slide forwardly in the trailer king pin receiving slot 10. The initial forward movement of the jaws will cause the dog 16 to strike the detent 57, which at this time is disposed in the broken line position in Figure 12, and swing it for moving the links 51 and 52 from their broken line positions (Figure 12) and past dead center position. This will permit the locking dogs 37 and 38 to move toward each other and the dog 38 will engage behind the tooth 59 when the channel 12 is moved to its forward position and will prevent retraction of the channel bar 12 and track G until the truck is again connected to the trailer.

I claim:

1. A device of the type described comprising a king-pin carrying member movable between two extreme positions, a landing leg actuating member operated by the first-named member to move a pair of landing legs into operative position when the first-named member is at its forward extreme position and to move the legs into inoperative position when the first-named member is at its rearward extreme position, said king-pin carrying member having a tooth, a pair of locking dogs movable in front of the king-pin carrying member when said king-pin member is in retracted position for holding said king-pin member against accidental forward movement and manually actuated means for freeing the dogs from the king-pin member for permitting forward movement of the king-pin member, one of said dogs being engageable with the tooth when the king-pin member is in its forward position, whereby the dog will hold the king-pin member against accidental retraction.

2. In a device of the type described, a king-pin carrying member movable between two extreme positions, a landing leg actuating member operated by the first-named member to move a pair of landing legs into operative position when the first-named member is at its forward extreme position and to move the legs into inoperative position when the first-named member is at its rearward extreme position, said king-pin carrying member having a tooth, a pair of locking dogs having springs for yieldingly urging them into the path taken by the first-named member, said dogs extending in front of the first-named member when it is in retracted position and preventing the first-named member from moving forwardly, a pair of links connected to the dogs and to a movable bar, manual means for moving the bar for causing the links to move the dogs away from each other to permit said first-named member to move forwardly, said bar moving the links into dead center position for holding the dogs in open position, said manual means including a detent movable into the path of the first-named member when said manual means separates the dogs, whereby forward movement of the first-named member will actuate the detent for causing the manual means to move the bar to swing the links from dead center position, whereupon the dogs will be yieldingly urged toward each other and one of the dogs will engage with the tooth when said first-named member is in forward position for preventing accidental retraction of the member.

3. In a device of the type described, a guide channel, a king-pin carrying member slidable therein, a pair of spring-pressed dogs adapted to extend into the channel from the sides for holding the member from moving forwardly when the member is in its rearmost position, a bar slidably carried by the channel, links connected to the bar and to the dogs, a bell-crank lever for moving the bar for causing the links to move into dead center position and separate the dogs to permit the passage of the member thereby, a detent moved by the lever into the path of the member when the lever is actuated to separate the dogs, said detent being moved by the member and moving the lever and bar for moving the links out of dead center position and permitting the dogs to move toward each other, a tooth carried by the member and engageable by one of the dogs when the member is in its forward position for preventing rearward movement of the member.

4. In a device of the type described, a guide channel, a king-pin carrying member slidable therein, a pair of spring-pressed dogs adapted to extend into the channel from the sides for holding the member from moving forwardly when the member is in its rearmost position, a bar slidably carried by the channel, links connected to the bar and to the dogs, a bell-crank lever for moving the bar for causing the links to move into dead center position and separate the dogs to permit the passage of the member thereby, a detent moved by the lever into the path of the member when the lever is actuated to separate the dogs, said detent being moved by the member and moving the lever and bar for moving the links out of dead center position and permitting the dogs to move toward each other, a tooth carried by the member and engageable by one of the dogs when the member is in its forward position for preventing rearward movement of the member, a cam slidable over said dog for freeing the dog from the tooth when the member is moved rearwardly, and a link carried by the member and connected to the cam, said link having relative movement with respect to the member for causing the cam to slide over the tooth and free the dog then engaging with the tooth before the member is moved rearwardly.

5. In a device of the type described, a channel guide, a member slidable in the guide, a king-pin support secured to the member and having a lost motion movement therebetween, whereby the support will be movable rearwardly an appreciable distance before moving the member rearwardly, a tooth carried by the member, a dog yieldingly engageable with the tooth for holding the member against rearward movement, a cam slidable over the dog for causing the dog to move free of the tooth when the member is moved rearwardly, and a connection between the cam and the king-pin support for moving the cam over the dog when the support is moved rearwardly with respect to the member, further rearward movement of the member carrying the tooth past the dog held retracted by the cam.

6. In a device of the type described, a pair of jaws adapted to grip a king-pin, a plate fastened to the jaws, and a safety dog pivotally secured to the plate and being swingable about an axis extending at right angles to the king-pin axis.

7. In a trailer, a frame member extending in substantially a horizontal direction, a channel shaped leg pivotally mounted on the frame member and having its channel sides extending in such a direction as to straddle the frame member when the leg is swung from a vertical position into a horizontal position, the leg being swingable into parallel relation with the frame member and in contact therewith, whereby the leg can be disposed at a higher position on frame member when swung into a horizontal position.

8. In a trailer, a frame member extending in substantially a horizontal direction, a channel shaped leg pivotally mounted on the frame member and having its channel side extending in such a direction as to straddle the frame member when the leg is swung from a vertical position into a horizontal position, whereby the leg can be disposed at a higher position on frame member when swung into a horizontal position, wheels secured to the free end of the leg and straddling the leg so as to straddle the frame member when the leg is in its horizontal position.

9. The combination with a semi-trailer having longitudinally extending side frames, channel-shaped legs pivotally secured to the side frames and being swingable rearwardly and upwardly from a vertical to a horizontal position, the legs being swingable into parallel relation with the side frames and in contact therewith, the open sides of the channels facing rearwardly when the legs are in vertical position, the channels of the legs being wide enough to receive the side frames when the legs are swung into horizontal position, and a cross member interconnecting the two legs together so that they will swing as a unit.

10. The combination with a semi-trailer having longitudinally extending side frames, channel-shaped legs pivotally secured to the side frames and being swingable rearwardly and upwardly from a vertical to a horizontal position, the open sides of the channels facing rearwardly when the legs are in vertical position, the channels of the legs being wide enough to receive the side frames when the legs are swung into horizontal position, and a cross member interconnecting the two legs together so that they will swing as a unit, an arcuate cam movable along the trailer for raising or lowering the legs, and cam rollers carried by the cross member and riding on the cam, said rollers swinging the legs into vertical position when the cam is moved in one direction and swinging the legs into a horizontal position when the cam is moved in the other direction.

RALPH W. STARR.

REFERENCES CITED

The following references are of record in the file of this patent:

UNITED STATES PATENTS

| Number | Name | Date |
| --- | --- | --- |
| 1,935,112 | Connors | Nov. 14, 1933 |
| 1,611,947 | Reid | Dec. 28, 1926 |
| 2,120,509 | Reid | June 14, 1938 |